United States Patent
Wang

(10) Patent No.: US 10,701,621 B2
(45) Date of Patent: Jun. 30, 2020

(54) SMALL CELL DISCOVERY IN A COMMUNICATION NETWORK

(71) Applicant: Samsung Electronics Co., Ltd., Suwon-si, Gyeonggi-do (KR)

(72) Inventor: Yue Wang, Middlesex (GB)

(*) Notice: Subject to any disclaimer, the term of this patent is extended or adjusted under 35 U.S.C. 154(b) by 0 days.

(21) Appl. No.: 15/673,210

(22) Filed: Aug. 9, 2017

(65) Prior Publication Data

US 2018/0049112 A1 Feb. 15, 2018

(30) Foreign Application Priority Data

Aug. 9, 2016 (GB) .................................... 1613701.0

(51) Int. Cl.
*H04W 48/16* (2009.01)
*H04L 12/26* (2006.01)
(Continued)

(52) U.S. Cl.
CPC ........... *H04W 48/16* (2013.01); *G01S 5/0242* (2013.01); *H04J 11/0079* (2013.01);
(Continued)

(58) Field of Classification Search
CPC ..... H04W 36/04; H04W 24/10; H04W 36/00; H04W 36/30; H04W 84/045;
(Continued)

(56) References Cited

U.S. PATENT DOCUMENTS

2006/0205406 A1* 9/2006 Pekonen ................ H04W 24/10
455/436
2008/0080414 A1* 4/2008 Thubert ................ H04W 76/12
370/328
(Continued)

FOREIGN PATENT DOCUMENTS

EP 2306774 A1 4/2011
EP 2941063 A1 11/2015
(Continued)

OTHER PUBLICATIONS

Foreign communication from related counterpart application, Application No. GB1613701.0, dated Jan. 24, 2017, combined Search and Examination Report under Sections 17 and 18(3), 8 pages.
(Continued)

*Primary Examiner* — Margaret G Mastrodonato

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for operating a terminal in a wireless communication system includes transmitting, to a macro base station, first information for indicating a link quality between the terminal and a small base station. The method also includes receiving, from the macro base station, a message for instructing a handover, and performing the handover from the macro base station to the small base station according to the message. The handover is determined based on the first information and second information for indicating another link quality between the small base station and the macro base station.

20 Claims, 12 Drawing Sheets

(51) Int. Cl.
*G01S 5/02* (2010.01)
*H04J 11/00* (2006.01)
*H04L 5/00* (2006.01)
*H04W 48/20* (2009.01)
*H04W 52/02* (2009.01)
*H04W 64/00* (2009.01)
*H04W 24/02* (2009.01)
*H04W 84/04* (2009.01)

(52) U.S. Cl.
CPC ........ *H04L 5/0094* (2013.01); *H04L 43/0811* (2013.01); *H04L 43/10* (2013.01); *H04L 43/16* (2013.01); *H04W 48/20* (2013.01); *H04W 52/0229* (2013.01); *H04W 64/003* (2013.01); *G01S 5/0252* (2013.01); *H04L 43/0852* (2013.01); *H04W 24/02* (2013.01); *H04W 84/045* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/142* (2018.01); *Y02D 70/144* (2018.01); *Y02D 70/20* (2018.01); *Y02D 70/21* (2018.01); *Y02D 70/24* (2018.01); *Y02D 70/25* (2018.01)

(58) Field of Classification Search
CPC ..... H04W 84/04; H04W 24/02; H04W 48/16; H04W 48/20; H04W 88/08; H04W 64/003
See application file for complete search history.

(56) References Cited

U.S. PATENT DOCUMENTS

| | | | |
|---|---|---|---|
| 2009/0180428 A1 | 7/2009 | Viswanath | |
| 2011/0081903 A1* | 4/2011 | Cai | H04W 36/0058 455/424 |
| 2012/0028627 A1* | 2/2012 | Hunzinger | H04W 36/0083 455/422.1 |
| 2012/0063417 A1* | 3/2012 | Redana | H04W 36/22 370/331 |
| 2013/0130695 A1* | 5/2013 | Ryu | H04W 36/0083 455/438 |
| 2013/0194948 A1* | 8/2013 | Mallik | H04W 24/00 370/252 |
| 2013/0254379 A1* | 9/2013 | Meylan | H04W 28/24 709/224 |
| 2014/0024375 A1* | 1/2014 | Fitzpatrick | H04W 36/30 455/436 |
| 2014/0269464 A1 | 9/2014 | Park et al. | |
| 2015/0215184 A1 | 7/2015 | Sundararajan et al. | |
| 2015/0223156 A1 | 8/2015 | Park et al. | |
| 2015/0245272 A1* | 8/2015 | Lindoff | H04W 48/06 370/332 |
| 2015/0358831 A1* | 12/2015 | Uchiyama | H04W 16/18 455/446 |
| 2017/0311217 A1* | 10/2017 | Jung | H04W 36/04 |

FOREIGN PATENT DOCUMENTS

| | | |
|---|---|---|
| GB | 2475851 A | 6/2011 |
| WO | 2013020522 A1 | 2/2013 |
| WO | 2015043503 A1 | 4/2015 |
| WO | 2015143724 A1 | 10/2015 |
| WO | 2016206964 A1 | 12/2016 |

OTHER PUBLICATIONS

DMC R&D Center, Samsung Electronics Co., Ltd., 5G Vision, Feb. 2015, 16 pages.

3GPP TR 36.839 V11.1.0 (Dec. 2012), 3rd Generation Partnership Project; Technical Specification Group Radio Access Network; Evolved Universal Terrestrial Radio Access (E-UTRA); Mobility enhancements in heterogeneous networks (Release 11), 53 pages.

NTT Docomo, Inc., Enhanced cell identification and measurements for CA, R2-120277, 3GPP TSG-RAN WG2 #77, Dresden Germany, Feb. 6-10, 2012, 3 pages.

Nokia Siemens Networks, Nokia Corporation, "Enhancements for Small Cell Detection," R2-120523, 3GPP TSG-RAN WG2 Meeting #77, Dresden, Germany, Feb. 6-10, 2012, 12 pages.

Qualcomm Incorporated, "Inter-frequency Small Cell Identification," R2-120654, 3GPP TSG-RAN2 Meeting #77, Dresden, Germany, Feb. 6-10, 2012, 2 pages.

Huawei, Hisilicon, "Small Cell Discovery in HetNet," R2-121248, 3GPP TSG-RAN WG2 Meeting #77bis, Jeju, Korea, Mar. 26-30, 2012, 7 pages.

Ericsson, St-Ericsson, "Small Cell Detection," R2-121417, 3GPP TSG-RAN WG2 #77bis, Jeju Island, Republic of Korea, Mar. 26-30, 2012, 3 pages.

Nokia Siemens Networks, Nokia Corporation, "Small cell signal based control of inter-frequency measurements," R2-121621, 3GPP TSG-RAN WG2 Meeting #77bis, Jeju, Korea, Mar. 26-30, 2012, 5 pages.

Renesas Mobile Europe Ltd., "Enhancement of proximity indication in heterogeneous networks," R2-121665, 3GPP TSG-RAN WG2 Meeting #75bis, Jeju, Korea, Mar. 26-30, 2012, 4 pages.

* cited by examiner

| Fingerprint 1 | ... | Fingerprint M |
|---|---|---|
| $MacroBSID_{11}$ | ... | $MacroBSID_{M1}$ |
| $RSRP_{11}$ | ... | $RSRP_{M1}$ |
| $MacroBSID_{12}$ | ... | $MacroBSID_{M2}$ |
| $RSRP_{12}$ | ... | $RSRP_{M2}$ |
| ... | ... | ... |
| $MacroBSID_{1N}$ | ... | $MacroBSID_{MN}$ |
| $RSRP_{1N}$ | ... | $RSRP_{MN}$ |

FIG.1B

SMALL CELL DISCOVERY IN A COMMUNICATION NETWORK

CROSS-REFERENCE TO RELATED APPLICATION AND CLAIM OF PRIORITY

This application is related to and claims priority to Application No. GB 1613701.0, filed on Aug. 9, 2016, the contents of which are incorporated herein by reference.

TECHNICAL FIELD

The present invention relates to a telecommunication network scenario where so-called small cells are overlaid onto a network configuration employing larger macro-cells.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There is an ever-increasing desire to improve the rate and volume of data throughput in communications networks, given the increase in data-hungry mobile applications and services. To achieve significant throughput enhancement in a practical manner, it is usually necessary to deploy a large number of cells in a given area and to manage them intelligently. As such, it is envisaged that future Fifth Generation (5G) deployment may take the form of an overlaid network in conjunction with existing Fourth Generation (4G) macro cells. The 5G small cells can be coupled with the overlaid 4G macro cells. In such a deployment, the 4G macro base stations will deliver control information to the small cells and user Equipment (UE), while data transmission will largely be performed between the small cell and the UE, usually operating at a different frequency.

In macro-cell only deployment, for the purpose of initial access, a UE performs periodical measurement of the macro base stations, and identifies the cells with, for example, the largest reference signal received power or reference signal received quality (RSRP/RSRQ) measured at the reference signals transmitted from the base stations, followed by cell selection for connection or handover purposes.

In a heterogeneous network deployment where macro and small cells operate on different frequencies, in order to identify opportunities to offload traffic to the small cells, the UE needs to periodically perform inter-frequency scanning, which causes service interruption between the small cell base station and the UE, as well as causing relatively large energy consumption at the UE. In fact, it has been shown in TR 36.839 that significant power consumption can occur in a UE when inter-frequency measurement is continuously performed over the cell-specific reference signals, while a relatively low impact on offloading potential is observed.

Small cell discovery in a macro deployment with small cells has been considered in 3GPP TR 36.839, especially macro-assisted small cell discovery. In one of the methods, a dedicated discovery reference signal (DRS) is used to trigger the detection of the small cells. In another method, DRX/DTX was used to perform inter-frequency measurements for small cell discovery.

A proximity-based small cell discovery process is illustrated in FIG. 1A. FIG. 1A shows the message exchange between a UE 301 and eNB 302.

In FIG. 1A, detection of the proximity of small cells 312 is usually performed by using a received signal strength (RSS) based radio map. The entries of the map, called radio fingerprint, are used to ascertain the proximity of the UE to the small cell. An illustration of an exemplary fingerprint database structure is shown in, FIG. 1B. Such a database may be created by using past experience of the terminals and may be stored either at the macro cell base station or at the terminal. Proximity of small cell is detected 312 when the RSRP measured at the UE is at a given range of the RSRP in the database (the so-called 'fingerprint match').

After proximity is detected, the UE either attaches to that small cell directly, or it performs some measurement of the small cells that are identified as 'proximity cells'. One example of such measurement 321 is given in FIG. 1, which includes the measurement of, for example, RSRP, RSRQ, of the small cells, and is measured over the carrier frequency of the small cell. Such measurements are then reported back to the macro base station, and offloading to the small cell occurs when a given criterion is satisfied, for example, when the measured signal strength is higher than a threshold.

Generally, small cell discovery/selection focus on providing efficient measurement configuration (e.g., measurement gap or time duration, rate of measurement etc) for the purpose of power saving. One of the problems that has generally been overlooked is that a good backhaul connection from the small cells to the core network is not always guaranteed. Unlike macrocells, small cells are typically located in hard-to-reach near ground locations, rather than in the clear, high above rooftops, and so, small-cell backhaul can take different forms, using various wireless or wired technologies. In particular, unlike macro base stations that are connected to the core network via fibre-optic connections, where the quality of the connection is almost always guaranteed, the small cells may connect to the core network wirelessly, with a possibly uncertain quality of connection to the core network.

It is therefore possible that a UE can detect strong received signals from a small cell base station (indicated by the RSRP/RSRQ measurement), but cannot effectively communicate with the core network due to an interrupted backhaul connection between the small cell and the core network. As a result, a UE only using the received signal power as measurement for small cell discovery may suffer from severe performance degradation even when a strong link between the small cell base station and the UE exists, which causes delays, interruptions of communications, and unpleasant customer experience and is therefore highly undesirable. Such is illustrated in FIG. 2, as FIG. 2 illustrates a representation of a macro and small-cell deployment. FIG. 2 depicts a core network 350 connected to a macro cell base station 352 via a fiber connection 351, which offers a good quality of connection. It also shows a UE 353 which is connected to a small cell 354, which is connected wirelessly via wireless connection 355 to the core network 350. The wireless connection 355 offers an uncertain level of connection quality and can vary.

SUMMARY

To address the above-discussed deficiencies, it is a primary object to provide a method of performing small cell discovery in a telecommunication network comprising macro cells and small cells, comprising the steps of: a User Equipment UE connecting to a small cell if a Wireless Backhaul Connection Indicator, WBCI, indicates that a suitable backhaul connection exists for the small cell.

In an embodiment, the WBCI is one of: a numeric; a binary; or a quantified value.

In an embodiment, the WBCI is assessed at the eNB of the macro cell and if it is determined to be suitable, then the eNB issues a handover command to the UE to connect to the small cell.

In an embodiment, the handover command is only issued if a suitable level of RSRP and/or RSRQ is measured at the UE.

In an embodiment, the UE transmits a probing signal to the small cell; the small cell transmits the probing signal to the eNB and the eNB determines WBCI on the basis of the probing signal it receives.

In an embodiment, the eNB determines a stochastic WBCI for the small cell and transmits this to the UE; the UE decides whether to connect to the small cell on the basis of the stochastic WBCI.

In an embodiment, if the UE decides to connect to the small cell, it transmits update WBCI information to the eNB.

According to another aspect of the present invention, there is provided an apparatus arranged to perform the method of the preceding aspect.

In an Embodiment, the WBCI is Determined at an eNB of a Macro Cell.

According to another aspect of the present invention, a method for operating a terminal in a wireless communication system includes transmitting, to a macro base station, first information for indicating a link quality between the terminal and a small base station, receiving, from the macro base station, a message for instructing a handover, and performing the handover from the macro base station to the small base station according to the message. The handover is determined based on the first information and second information for indicating another link quality between the small base station and the macro base station.

According to another aspect of the present invention, an apparatus for a terminal in a wireless communication system includes at least one transceiver and at least one processor operatively coupled with the at least one transceiver. The at least one processor is configured to control to transmit, to a macro base station, first information for indicating a link quality between the terminal and a small base station, receive, from the macro base station, a message for instructing a handover, and perform the handover from the macro base station to the small base station according to the message. The handover is determined based on the first information and second information for indicating another link quality between the small base station and the macro base station.

According to another aspect of the present invention, the apparatus for a macro base station in a wireless communication system includes at least one transceiver and at least one processor operatively coupled with the at least one transceiver. The at least one processor is configured to control to receive, from a terminal, first information for indicating a link quality between the terminal and a small base station, determine second information for indicating another link quality between the small base station and the macro base station, determine a handover based on the first information and the second information, and transmit, to the terminal, a message for instructing the handover.

According to the present invention there is provided an apparatus and method as set forth in the appended claims. Other features of the invention will be apparent from the dependent claims, and the description which follows.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1B illustrates an exemplary fingerprint database structure, according to an embodiment of the present disclosure;

DETAILED DESCRIPTION

Figure 1A:
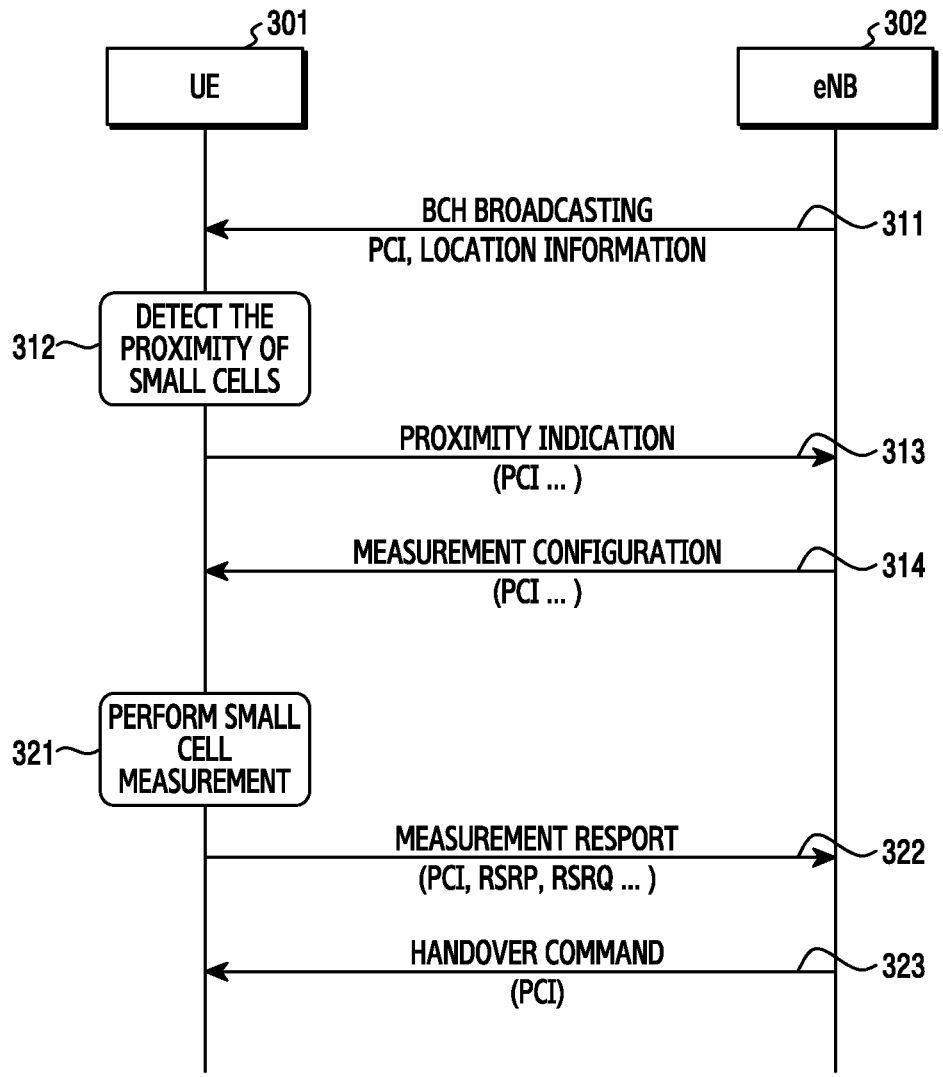
FIG. 1A illustrates a small cell discovery process, according to an embodiment of the present disclosure.
Figure 2:
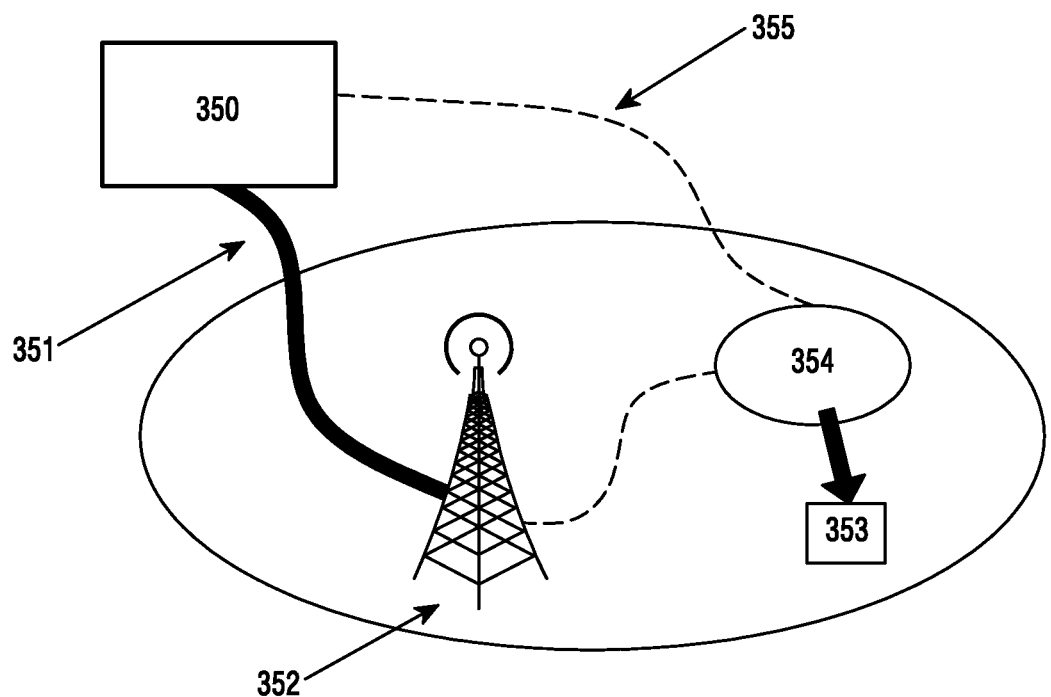
FIG. 2 illustrates a representation of a macro and small-cell deployment, according to an embodiment of the present disclosure.

FIGS. 1A through 2, discussed above and FIGS. 3 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the invention disclosed herein are concerned with the discovery of small cell base station in a heterogeneous network, where a Release 12 and beyond UE terminal accesses the small cell base station via a carrier with a different frequency to the macro carrier frequency. In particular, the invention is concerned with the discovery of the small base station, and in addition to the RSRP/RSRQ measurement between the small cell and the UE, a parameter indicating the quality of the backhaul connection is also considered. Such a parameter, referred to as 'Wireless backhaul connection indicator' (WBCI) herein, could be measured by the UE itself (an instant indication), or maintained and updated at the small cells using past experience from this and the other UEs. Details will follow.

In the process of small cell discovery, various techniques may measure small cell RSRP/RSRQ which indicates the channel quality between UE and small cell base station. However this quality information is different from the WBCI disclosed herein, in the sense that WBCI is the quality between the small cell base station and the macro base station.

In addition, embodiments of the present disclosure are different from a WLAN/LTE interworking in the sense that the WiFi AP Router connects to Ethernet using a wired (not a wireless) connection, in which case the relevance of a backhaul connection indicator is trivial. However, in a wireless base connection there is a question regarding the reliability (due to blockage or whether conditions for example) so, in a 5G scenario, an indication of wireless backhaul quality (WBCI) is useful. This measure indicates the channel quality between small cell base stations and macro base station which are connected wirelessly.

Figure 3:
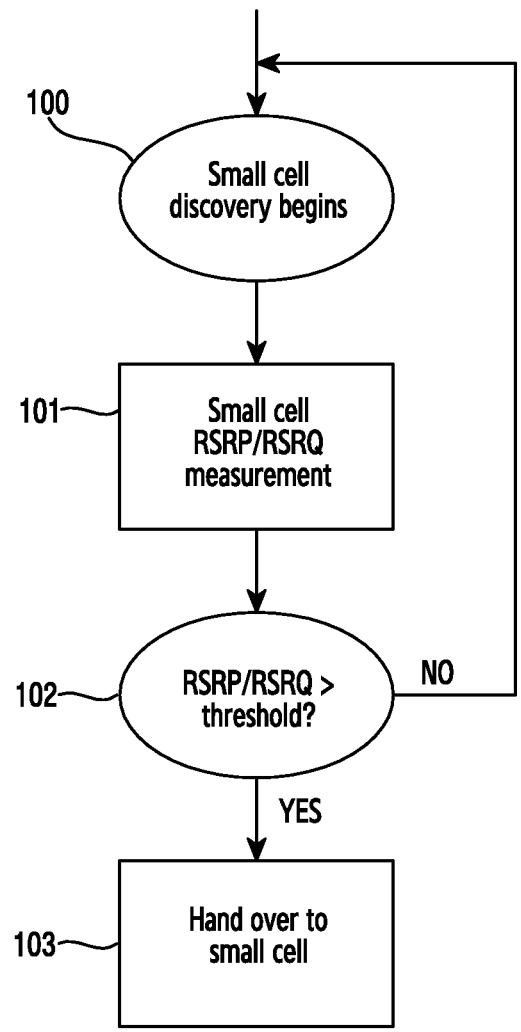
FIG. 3 illustrates a small cell discovery process, according to an embodiment of the present disclosure.

FIG. 3 illustrates a small cell discovery process according to an embodiment of the present disclosure. At step 100, the small cell discovery process begins. At step 101, a measurement of RSRP and/or RSRQ is made by the UE, as referred to previously. At step 102, a determination is made whether the measured value exceeds a threshold, which is selected to indicate an acceptable service level. If the threshold is exceeds, then at step 103, handover to the small cell is performed. If the threshold is not exceeded, then the process begins again at step 100 in an attempt to locate a suitable small cell.

As illustrated in FIG. 3 the measurement evaluation in 102 indicates a satisfactory connection between the small cell and the UE, assuming that there is a good link between the small cell and the core network. In practical scenarios where small cells are connected to core network via wireless links, leading to possible imperfect backhaul connection between the small cell and the core network, such a small cell discovery mechanism may lead to severe performance degradation, as the small cell that the UE chooses to attach to may not be able to communicate well with the core network. This is in spite of the threshold tested for at step 102 being exceeded.

Figure 4:
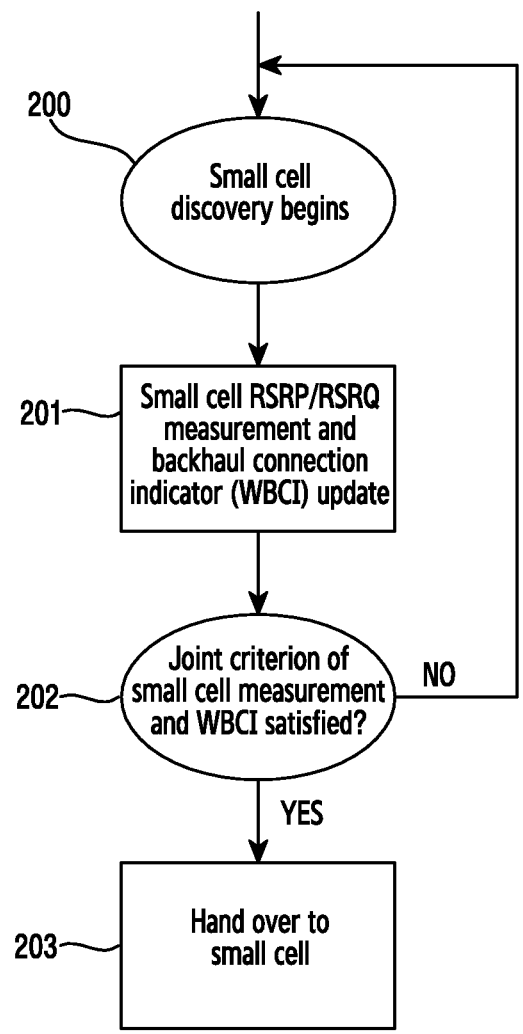
FIG. 4 illustrates a small cell discovery process according to an embodiment of the present disclosure.

FIG. 4 illustrates a small cell discovery process according to an embodiment of the present disclosure. In an embodiment, FIG. 4 augments the illustration and configuration of FIG. 3.

In FIG. 4, the small cell discovery process begins at step 200. At step 201, the UE measures the RSRP and/or RSRQ as set out previously. However, it additionally obtains a newly defined indicator—Wireless Backhaul Connection Indicator (WBCI). More details of this will follow.

At step 202, two criteria are compared to different thresholds. Firstly, a determination is made to see if RSRP/RSRQ exceeds a first threshold. Secondly, a determination is made to see if WCBI exceeds a second threshold. The determinations may be made in any order.

If both thresholds are exceeded, then this indicates not only a good signal strength between the UE and the small cell, but also a good level of connection quality of the small cell base station to the core network. In this case, at step 203, handover takes place to the small cell.

If one or both thresholds are not exceeded, then the process begins again at step 200 in an attempt to locate a suitable small cell.

WBCI may be measured by the UE itself to yield an instantaneous indication of connection quality or, alternatively, it may be maintained and updated at the respective small cells, using their own past experience the UE in question and other UEs. This allows a small cell to build a database of experiential data based on past performance.

Other methods of obtaining WBCI may include aggregated past experience of UEs connected to a particular small cell; and of maintaining and updating WBCI, for example, through a feedback mechanism, and/or through predication or data mining of past WBCI, and/or through a learning process from the feedback from the current/other UEs.

Figure 5:
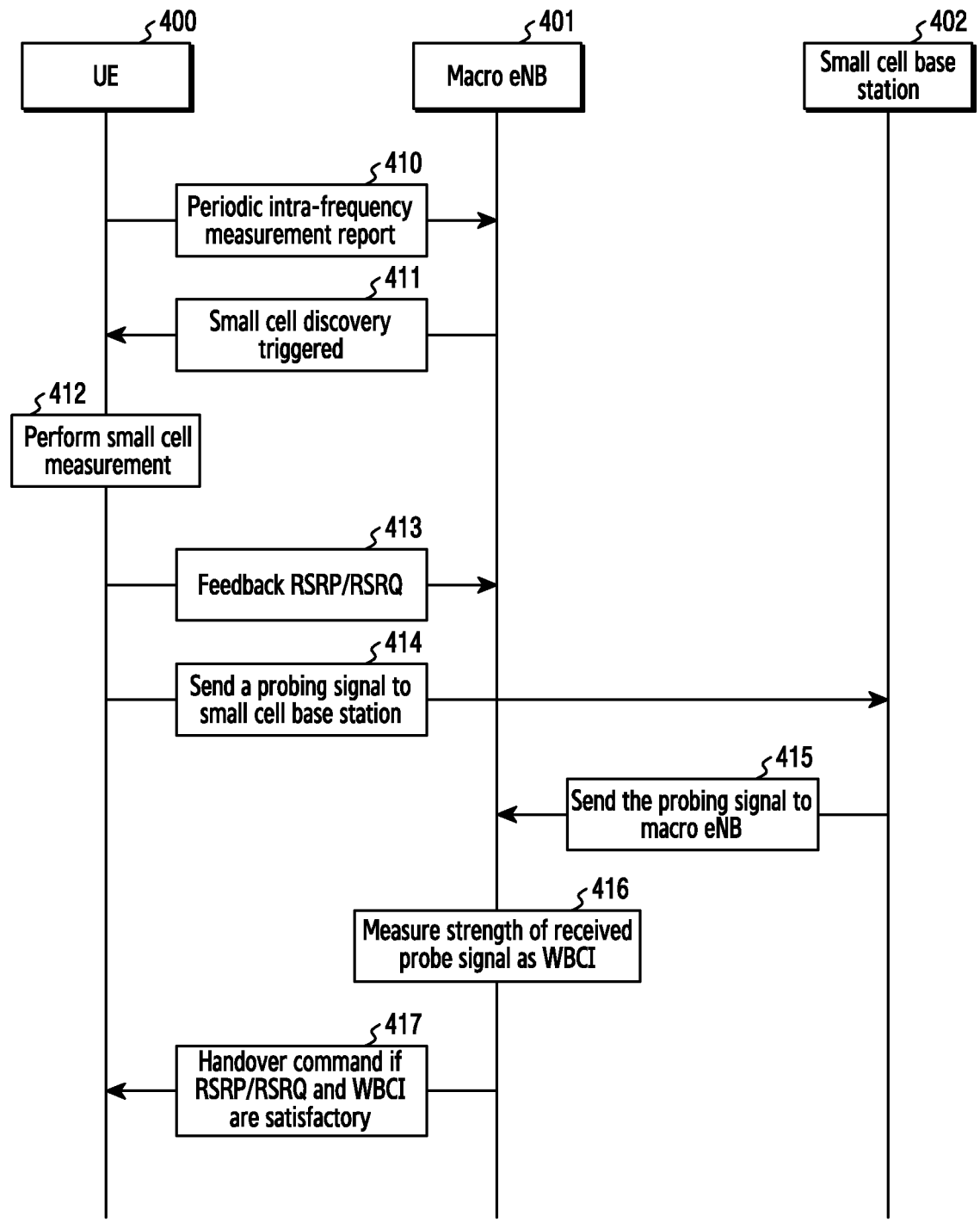
FIG. 5 illustrates a detailed message exchange structure according to an embodiment of the present disclosure.
Figure 6:
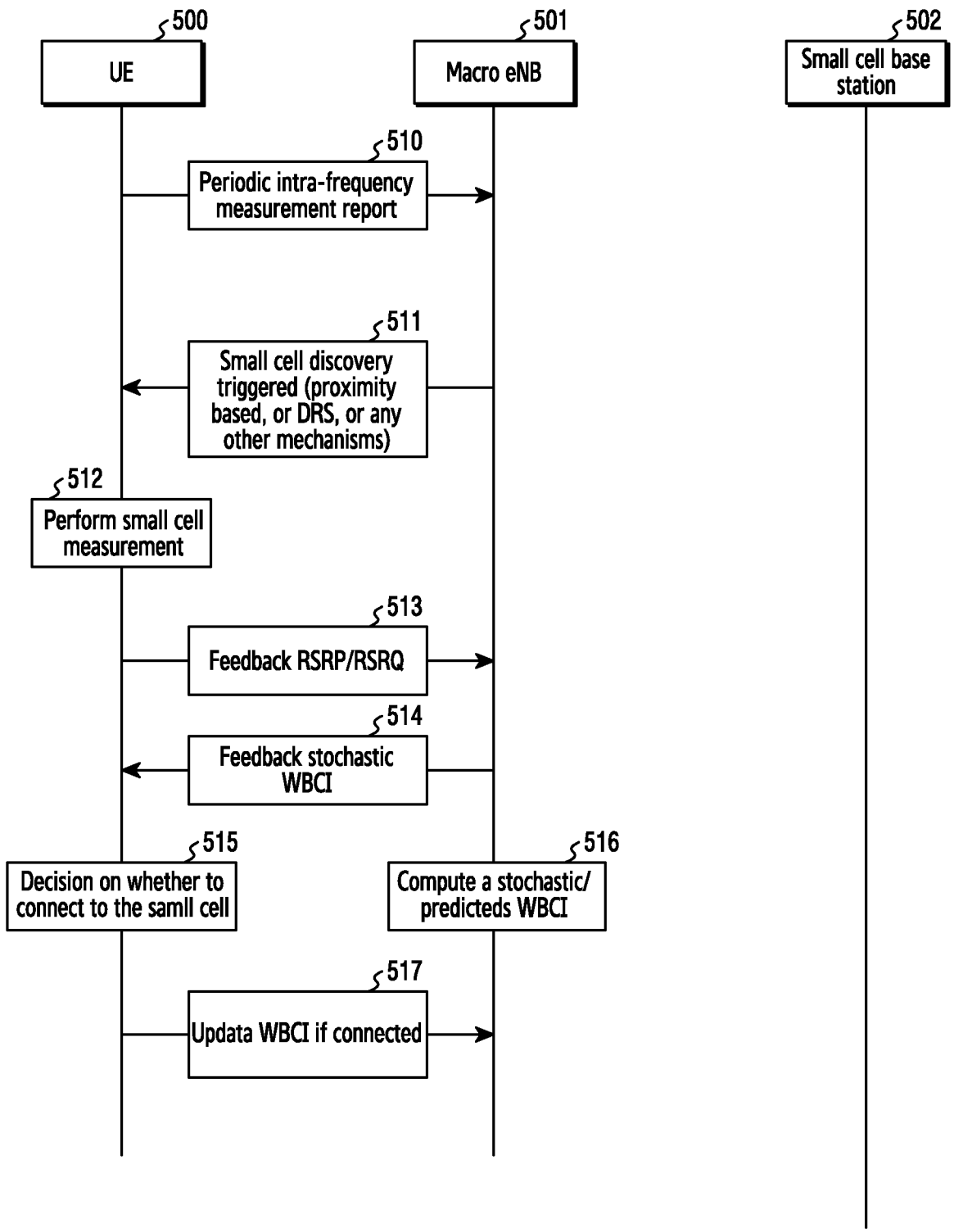
FIG. 6 illustrates a further detailed message exchange structure according to an embodiment of the present disclosure.

FIG. 4 shows a basic process according to an embodiment of the present disclosure. FIGS. 5 and 6 show further detail of how WBCI may be obtained and details of this will follow.

In FIG. 5, illustrates a detailed message exchange structure according to an embodiment of the present disclosure. For example, FIG. 5, portrays a message exchange sequence between a UE 400, a Macro eNB 401 and a small cell base station 402.

Steps 410 to 413 relate to the small cell discovery process involving the UE making periodic intra-frequency measurements and reporting this 410 to the Macro eNB 401. The Macro eNB 401 issues a small cell discovery trigger to the UE 400 which then performs a small cell measurement process 412.

The UE 400 then Feeds back RSRP/RSRQ to the Macro eNB 401.

Steps 414 to 417 are associated with an embodiment of the present disclosure. At step 414, the UE 400 additionally sending a probing signal to small cell base station 402. At step 415, the small cell base station 402 sends the probing signal to the Macro eNB 401. At step 416, the eNB measures the strength of the received probe signal and from this calculates WBCI.

WBCI can be numeric or binary, or a quantified value. It is an indication of the backhaul quality. For example, if the strength of the probing signal is measures as 20 dB, this indicates that the backhaul connection is quite good, Therefore, WBCI can be a numeric value of 20 dB or, only say it is '1' (if '1' means good and '0' means bad). It can, alternatively, take a quantified value, for example, a level of '4' (if 0-5 indicates backhaul connection being from 'no connection (0)' to 'excellent connection (5)').

At step 417, assuming that the RSRP/RSRQ measurements exceed a defined threshold and WBCI is satisfactory, then the eNB issues a handover command to the UE 400.

As can be seen from the above, in this case, an instantaneous measure of WBCI is determined and the handover decision is based on this, in addition to the RSRP/RSRQ measurements performed.

FIG. 6 illustrates a further detailed message exchange structure according to an embodiment of the present disclosure. For example, FIG. 6 portrays an alternative embodiment where, instead of using an instantaneous mechanism, as described in FIG. 5, the UE 500 is able to learn from its own past performance and those of surrounding UEs and updates a stochastic WBCI. This technique is useful in cases where there is a dense deployment of small cells with multiple UEs accessing the network at the same time.

In FIG. 6, there is shown a UE 500, a macro eNB 501 and a small cell base station 502. Steps 510 to 513 are substantially identical to steps 410 to 413 shown in FIG. 5, so no details of these omitted here for brevity.

It should be noted, that compared to the embodiment of FIG. 5, there is no signaling required to the small cell base station 502, which reduces the overall signaling overhead.

In the embodiment of FIG. 6, the macro eNB 501 maintains a database of small cell WBCI. Such a database can be obtained by, for example, feedback from each UE after it is connected to the small cell, where such feedback may be, for example, data throughput, Block Error Rate (BLER), Quality of Service (QoS) (a soft feedback) or a '1'/'0' (a hard feedback) when the transmission between UE and small cell is successful/not successful, and updated by the UE (either the current UE 500 or different UEs that have connected to the same small cell base station) to macro eNB 501 after one transmission is complete. The macro eNB 501 collects such updates, and computes a stochastic WBCI (at step 516), which may be, for example, average throughput, average BLER, average QoS, or rate of successful/unsuccessful transmission by using this small cell collected at step 517.

In FIG. 6, the UE 500 will perform small cell measurement as indicated in step 512. The RSRP/RSRQ will be fed back to macro eNB 501 at step 513. When RSRP/RSRQ indicates a satisfactory measured received signal meaning a reasonably good connection between the small cell base station 502 and the UE 500, the macro eNB 501 then feedbacks a stochastic WBCI (obtained at step 516) at step 514.

At step 515, the UE 500 decides whether or not to connect to the small cell base station 502. The decision making process may be described, by way of at least four examples. First, if the target QoS/Throughput of the UE is greater than the feedback stochastic QoS/Throughput, then the process determines whether to connect or not connect. In another embodiment, if the target BLER/FER of the UE is less than the feedback stochastic BLER/FER, then the process determines whether to connect not connect. Similarly, if the rate of successful transmission (ACK received) is greater than a threshold, then the process determines whether to connect not Connect. Additionally, if the rate of unsuccessful transmission (NACK received) is less than a threshold, then the process determines whether to connect or not connect.

Examples of WBCI take the form of stochastic QoS, stochastic BLER/FER, and rate of successful/unsuccessful transmission when connected to this small cell base station 502.

At step 516, computing a stochastic WBCI may involve, for example, taking an average of the throughput, and/or BLER, and/or QoS, and/or rate of successful/unsuccessful transmission by using data collected from UEs which have been successfully connected in the past. As such, historic data can be used to build a model of realistic, achievable, performance over time.

Additionally, macro eNB 501 in forming the stochastic WBCI mentioned above, may include, for example, predicting a WBCI according to the WBCIs received from multiple UEs at different time instants. Such a predication may be, for example, simply according to trends of transmissions from multiple UEs in a given time duration (using existing curve fitting methods), or according to the feature of the time/location where such transmissions happen.

For example, a prediction may be made according to the past experiences from multiple UEs.

In another example when the eNB 501 has a data base indicating traffic quality of the small cell base station 502 at a particular time (for example bad backhaul connection likely to happen when a UPS track blocks a wireless link from the small cell to macro eNB at 10 am every day), it may be used as a stochastic WBCI. Such a data base is obtained by using the feedback from UEs according to step 517.

A person skilled in art would understand that there are various predication techniques available which can be easily adapted for the purpose of predication.

Another embodiment related to the embodiment of FIG. 6 involves a learning process to update the WBCI to be sent to the UE at step 514. An example of such learning process is detailed below.

$$BCI(t+1) = BCI(t) + \alpha R(t) \quad \text{Equation (1)}$$

Where BCI(t+1) is the WBCI to be sent to UE at step 514 at time instant t+1, BCI(t) is the WBCI collected and computed according to equation (1) at a previous time slot t. In addition, α is a weighting factor, and R is a reward. Such a reward may be, for example, successful rate of connection of one or multiple UEs through this small cell. In principle, if there has been an increase in the successful rate of connection between time instant t and t+1 from one or multiple UEs that connected to this small cell base station, a reward is given and the chances of connecting to this small cell increases. Other examples of R could be increased throughput, increased QoS, etc.

In another example, a learning process may be $$BCI(t+1) = BCI(t) - \alpha P(t) \quad \text{Equation (2)}$$

where P is a penalty. In principle, if there has been a decrease in certain system measurements obtained from the UEs, for example, failure rate of connection between time instant t and t+1 from one or multiple UEs that connected to this small cell base station, a penalty is given and the chances of connecting to this small cell decreases. Other examples of P could be BLER or FER.

R(t) and P(t) are updated over time according to the data obtained at step 517.

It will be understood that the learning process can take different forms using machine learning technologies. The example stated above, in reinforcement learning language, takes the form of 'trial' (connecting to small cell)->'error search' (aggregating updates from UE and compute a scholastic WBCI ->'delayed reward' (feedback of the scholastic WBCI however not necessary benefit the UEs who contributed updating this information but may be used by this UE in the future). Other different forms/techniques of machine learning can be applied here, without affecting the general scope of the disclosure, which is defined by the claims.

Figure 7:
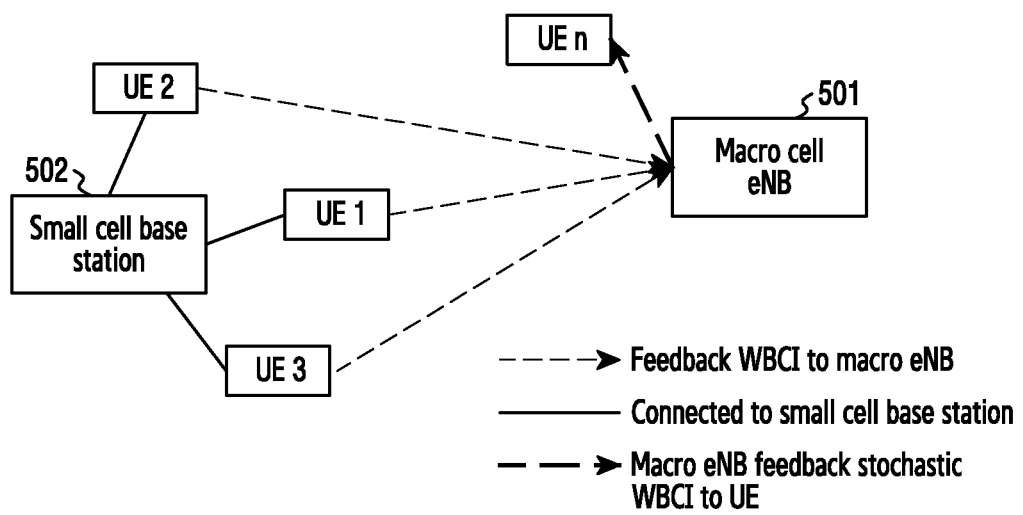
FIG. 7 illustrates a representation of aggregating data from several user equipments (UEs) according to an embodiment of the present disclosure.

Assuming that there are several UEs that have connected to the small cell base station 502 in the past, then this past experience can be usefully utilized and fed back to the macro eNB 501 to be used as an indication of WBCI for the current UE 500. The aggregation of such feedback is illustrated in FIG. 7, discussed in further detail below.

Step 517 allows the utilization of the past/current experience of this or other UEs being fed back to the macro eNB 501 as an indication of the WBCI for the current UE. Such an information feedback mechanism aggregated from other (nearby) UEs is illustrated in FIG. 7. FIG. 7 illustrates a representation of aggregating data from several user equipments (UEs) according to an embodiment of the present disclosure. For example, as portrayed in FIG. 7, a small cell base station 502 connected to multiple UEs (UE1, UE2 and UE3). Each of these UEs feeds back WBCI information to the Macro eNB 501, which makes use of this data to generate stochastic WBCI data, which is then supplied to new UE (UEn) which may attempt to connect to small cell base station 502. The stochastic data is supplied at step 514 in FIG. 6. In an embodiment, macro eNB 501 may be a macro cell eNB.

In embodiments of the present disclosure, a proximity based mechanism is used as an example. However it is understood that the proposed new signaling, i.e., WBCI between macro base station to the UE, could be applied to, and would benefit other currently available small cell discovery mechanism, such as Discovery Reference Signals (DRS) based small cell discovery.

Figure 8:
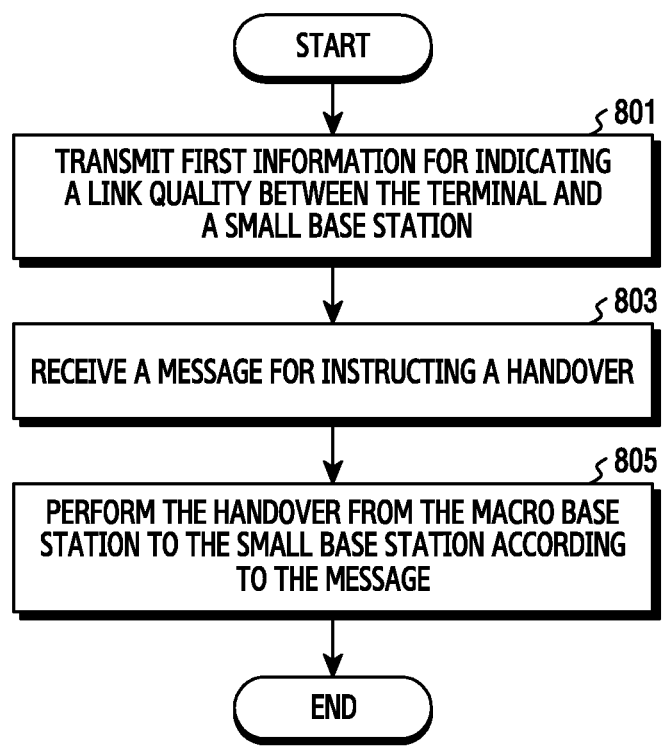
FIG. 8 illustrates a flowchart of a UE in a wireless communication system according to an embodiment of the present disclosure.

FIG. 8 illustrates a flowchart of a UE in a wireless communication system according to an embodiment of the present disclosure.

Referring to FIG. 8, in step 801, the UE transmits, to a macro base station, first information for indicating a link quality between the terminal and a small base station. In some embodiments, the UE transmits a probing signal to the small base station. The probing signal is transmitted from the small base station to the macro base station. The probing signal is used for determining the second information.

In step 803, the UE receives, from the macro base station, a message for instructing a handover. In some embodiments, the handover is determined based on the first information and second information for indicating another link between the small base station and the macro base station. In some embodiment, the second information is one of a numeric, a binary, and a quantified value. In some embodiments, the second information is determined by the macro base station. The message is received if a value of the second information is equal to or greater than a threshold. In some embodiments, the message is received if a value of the first information is equal to or greater than another threshold.

In step 805, the UE performs the handover from the macro base station to the small base station according to the message. In some embodiments, the UE determines whether to connect to the small base station based on the second information. In some embodiments, upon determining to connect to the small base station, the UE transmits update information for second information to the macro base station.

Figure 9:
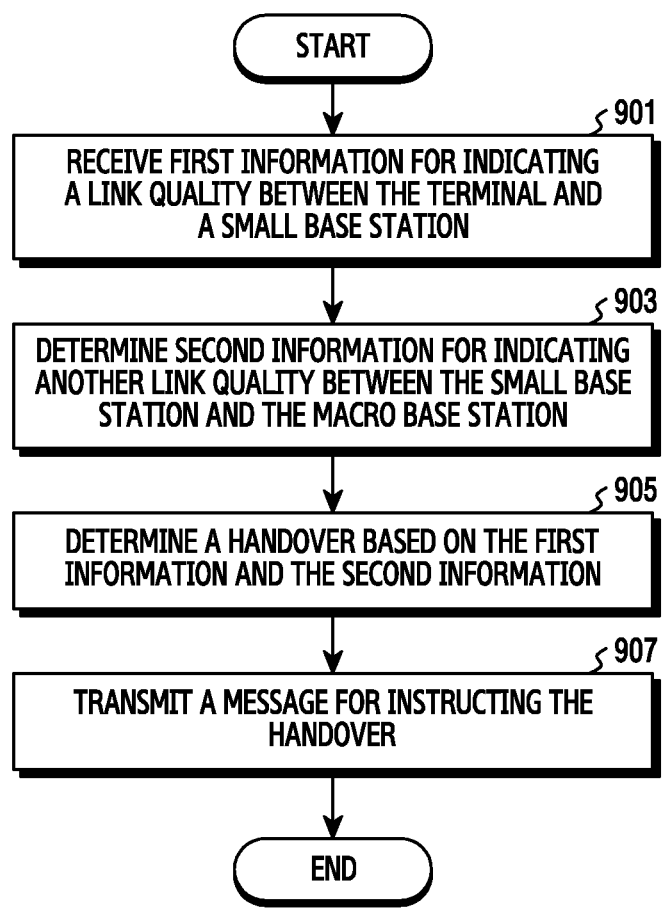
FIG. 9 illustrates a flowchart of a macro base station in a wireless communication system according to an embodiment of the present disclosure.

FIG. 9 illustrates a flowchart of a macro base station in a wireless communication system according to an embodiment of the present disclosure.

Referring to FIG. 9, in step 901, the macro base station receives, from a terminal, first information for indicating a link quality between the terminal and a small base station. In some embodiments, the macro base station receives, from the small base station, a probing signal. The probing signal is transmitted from the terminal to the small base station. The probing signal is used for determining the second information.

In step 903, the macro base station determines second information for indicating another link quality between the small base station and the macro base station. In some embodiments, the second information is one of a numeric, a binary, and a quantified value.

In step 905, the macro base station determines a handover based on the first information and the second information. In some embodiments, the second information is used for determining whether to connect to the small base station by the terminal.

In step 907, the macro base station transmits, to the terminal, a message for instructing the handover. In some embodiments, if a value of the second information is equal to or greater than a threshold, the macro base station transmits the message to the terminal. In some embodiments, if a value of the first information is equal to or greater than another threshold, the macro base station transmits the message to the terminal.

Figure 10:
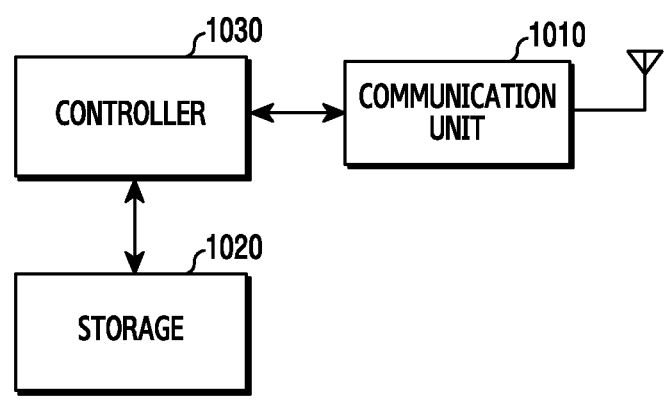
FIG. 10 illustrates an example configuration of a terminal in a wireless communication system according to an embodiment of the present disclosure.

FIG. 10 illustrates an example configuration of a terminal in a wireless communication system according to an embodiment of the present disclosure. FIG. 10 illustrates an example of a configuration of the UE 353. Hereinafter, the term "unit" or the term ending with the suffix "-er" or "-or" refer to a unit for processing at least one function or operation and these terms may be implemented by using hardware or software or a combination of hardware and software.

Referring to FIG. 10, the terminal includes a communication unit 1010, a storage 1020, and a controller 1030.

The communication unit 1010 may be a communication interface. The communication unit 1010 performs functions for transmitting and receiving signals via a radio channel. For example, the communication unit 1010 performs a function of converting between a baseband signal and a bit string according to a physical layer standard of a system. For example, when transmitting data, the communication unit 1010 generates complex symbols by encoding and modulating a transmission bit string. In addition, when receiving data, the communication unit 1010 restores a reception bit string by demodulating and decoding a baseband signal. In addition, the communication unit 1010 up-converts a baseband signal into an RF band signal and then transmit the RF band signal through an antenna, and down-converts an RF band signal received through the antenna into a baseband signal. For example, the communication unit 1010 may include a transmission filter, a reception filter, an amplifier, a mixer, an oscillator, a digital to analog converter (DAC), an analog-to-digital converter (ADC), or the like.

The communication unit 1010 may include a plurality of transmission/reception paths. The communication unit 1010 may include at least one antenna array configured by a plurality of antenna elements. In view of hardware, the communication unit 1010 may be configured by a digital circuitry and an analog circuitry (e.g., radio frequency integrated circuit (RFIC)). Here, the digital circuitry and analog circuitry may be implemented as one package. Also, the communication unit 1010 may include a plurality of RF chain. The communication unit 1010 may perform beamforming.

Also, the communication unit 1010 may include different communication modules for processing signals of different frequency band. The communication unit 1010 may include a plurality of communication modules for supporting a plurality of different wireless access technologies. For example, the plurality of different wireless access technologies may include Bluetooth low energy (BLE), wireless fidelity (Wi-Fi), Wi-Fi gigabyte (WiGig), cellular network (e.g., long term evolution (LTE)), or the like. Also, different frequency bands may include super high frequency (SHF) (e.g., 2.5 GHz, 5 GHz) band and millimeter wave(e.g., 60 GHz).

The communication unit 1010 transmits and receives signals as described above. Accordingly, the communication unit 1010 may be referred to as a transmission interface, a reception interface, a transmission and reception interface, a transmitter, a receiver or a transceiver. In addition, in the following description, transmitting and receiving performed through a radio channel may include processing by the communication interface 1010 as described above.

The storage 1020 stores data such as a basic program for the operation of the terminal, an application program, setting information, or the like. The storage 1020 may be configured by a volatile memory, a nonvolatile memory, or a combination of a volatile memory and a nonvolatile memory. In addition, the storage 1020 provides stored data in response to a request of the controller 1030.

The controller 1030 controls overall operations of the terminal. For example, the controller 1030 transmits and receives signals through the communication unit 1010. In addition, the controller 1030 records and reads data on and from the storage 1020. The controller 1030 may perform functions of a protocol stack which the communication standard requires. To achieve this, the controller 1030 may include at least one processor or microprocessor or may be a part of the processor. In addition, a part of the communication unit 1010 and the controller 1030 may be referred to as a communication processor (CP).

According to exemplary embodiments of the present disclosure, the controller 1030 may receive, from the macro base station, a message for instructing a handover determined based on the first information for indicating a link quality between the terminal and the small base station and the second information for indicating another link quality between the small base station and the macro base station. For example, the controller 1030 may control the terminal to perform operations according to the exemplary embodiments of the present disclosure.

Figure 11:
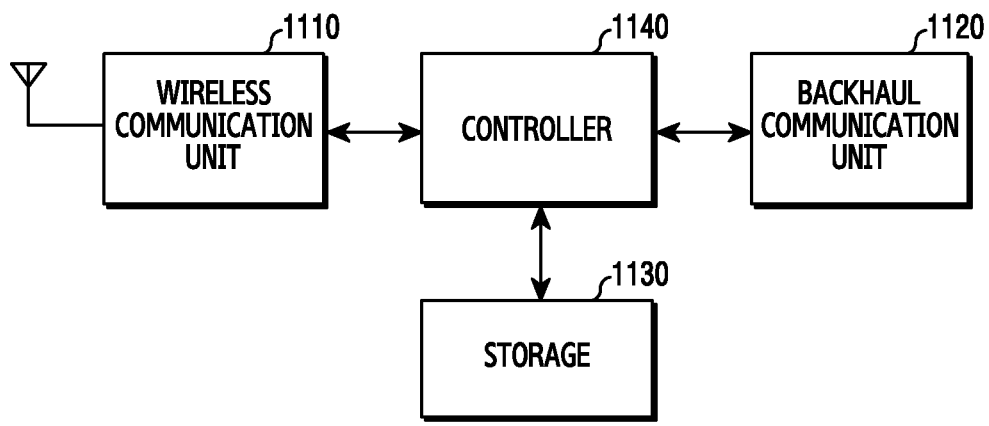
FIG. 11 illustrates an example configuration of a macro base station in a wireless communication system according to an embodiment of the present disclosure.

FIG. 11 illustrates an example configuration of a macro base station in a wireless communication system according to an embodiment of the present disclosure. FIG. 11 illustrates an example of a configuration of the macro cell base station 352. Hereinafter, the term "unit" or the term ending with the suffix "-er" or "-or" refer to a unit for processing at least one function or operation and these terms may be implemented by using hardware or software or a combination of hardware and software.

Referring to FIG. 11, the macro base station includes a wireless communication unit 1110, a backhaul communication unit 1120, a storage 1130, and a controller 1140.

The wireless communication unit 1110 performs functions for transmitting and receiving signals via a radio channel. For example, the wireless communication unit 1110 performs a function of converting between a baseband signal and a bit string according to a physical layer standard of a system. For example, when transmitting data, the wireless communication unit 1110 generates complex symbols by encoding and modulating a transmission bit string. In addition, when receiving data, the wireless communication unit 1110 restores a reception bit string by demodulating and decoding a baseband signal. In addition, the wireless communication unit 1110 up-converts a baseband signal into a radio frequency (RF) band signal and then transmit the RF band signal through an antenna, and down-converts an RF band signal received through the antenna into a baseband signal.

For example, the wireless communication unit 1110 may include a transmission filter, a reception filter, an amplifier, a mixer, DAC, ADC, or the like. In addition, the wireless communication unit 1110 may include at least one antenna array configured by a plurality of antenna elements. In view of hardware, the wireless communication unit 1110 may be configured by a digital unit and an analog unit, and the analog unit may be configured by a plurality of sub-units according to operation power and operation frequency.

The wireless communication unit 1110 transmits and receives signals as described above. Accordingly, the wireless communication unit 1110 may be referred to as a transmission interface, a reception interface, a transmission and reception interface, a transmitter, a receiver or a transceiver. In addition, in the following description, transmitting and receiving performed through a radio channel may include processing by the wireless communication interface 1110 as described above.

The backhaul communication unit 1120 provides an interface for communication with other nodes in a network. That is, the backhaul communication unit 1120 converts a bit string to be transmitted from the base station to another node, for example, another access node, another base station, a core network, or the like into a physical signal, and converts a physical signal received from another node into a bit string.

The storage 1130 stores data such as a basic program, an application program, setting information, or the like for the operation of the macro cell base station 352. The storage 1130 may be configured by a volatile memory, a nonvolatile memory, or a combination of a volatile memory and a nonvolatile memory. The storage 1130 provides the stored data according to a request of the storage 1130 and the controller 1140.

The controller 1140 controls overall operations of the macro cell base station 352. For example, the controller 1140 transmits and receives signals through the wireless communication unit 1110 or the backhaul communication unit 1120. In addition, the controller 1140 records and reads data on and from the storage 1130. The controller 1140 may perform functions of a protocol stack which a communication standard requires. To achieve this, the controller 1140 may include at least one processor.

According to exemplary embodiments of the present disclosure, the controller 1140 may determine a handover based on the first information for indicating a link quality between the terminal and the small base station and the second information for indicating another link quality between the small base station and the macro base station. For example, the controller 1140 may control the macro cell base station 352 to perform operations according to the exemplary embodiments of the present disclosure.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a terminal in a wireless communication system, the method comprising:
measuring a link quality between the terminal and a target base station that has a wireless backhaul connection to a core network;
transmitting, to a source base station, information regarding the link quality;
transmitting, to the target base station, a first probing signal for controlling the target base station to transmit a second probing signal to the source base station, wherein the second probing signal is used to determine backhaul quality information between the core network and the target base station; and
receiving, from the source base station, a message for instructing a handover from the source base station to the target base station,
wherein the handover is determined based on the link quality and the backhaul quality information in the source base station.

2. The method of claim 1, wherein the link quality and the backhaul quality information includes at least one of an average of throughput, block error rate, quality of service, rate of successful transmission, or rate of unsuccessful transmission.

3. The method of claim 1, wherein:
the link quality is transmitted to the source base station if the link quality is equal to or greater than a first threshold, and
the message is received if the backhaul quality information is equal to or greater than a second threshold.

4. The method of claim 1, wherein receiving the message for instructing the handover is based on:
whether a target quality of service (QoS) of the terminal is greater than a predicted QoS, the predicted QoS is included in the message, or
whether a target throughput of the terminal is greater than a predicted throughput, the predicted throughput is included in the message.

5. The method of claim 1, wherein receiving the message for instructing the handover is based on:
whether a target block error rate of the terminal is less than a predicted block error rate, the predicted block error rate is included in the message,
whether a rate of successful transmission included in the message is greater than a third threshold, or
whether a rate of unsuccessful transmission is less than a fourth threshold.

6. The method of claim 1, further comprising:
upon determining to connect to the target base station, transmitting updated data related to the backhaul quality information to the source base station.

7. The method of claim 1, wherein the backhaul quality information includes an indicator representing a predicted quality of the wireless backhaul connection, and
wherein the indicator is increased or decreased in response to a change of a successful rate and a failure rate of connection to the target base station.

8. A terminal in a wireless communication system, the terminal comprising:
at least one transceiver; and
at least one processor operatively coupled with the at least one transceiver,
wherein the at least one processor is configured to:

measure a link quality between the terminal and a target base station that has a wireless backhaul connection to a core network, transmit the link quality to a source base station, transmit, to the target base station, a first probing signal for controlling the target base station to transmit a second probing signal to the source base station, wherein the second probing signal is used to determine backhaul quality information between the core network and the target base station; and receive, from the source base station, a message for instructing a handover from the source base station to the target base station, wherein the handover is determined based on the link quality and the backhaul quality information in the source base station.

9. The terminal of claim 8, wherein the backhaul quality information includes at least one of an average of throughput, block error rate, quality of service, rate of successful transmission, or rate of unsuccessful transmission.

10. The terminal of claim 8, wherein the at least one processor is further configured to receive the message if the link quality is equal to or greater than a first threshold or the backhaul quality information is equal to or greater than a second threshold.

11. The terminal of claim 8, wherein the at least one processor is configured to receive the message for instructing the handover based on:

whether a target quality of service (QoS) of the terminal is greater than a predicted QoS, the predicted QoS is included in the message, or whether a target throughput of the terminal is greater than a predicted throughput, the predicted throughput is included in the message.

12. The terminal of claim 8, wherein the at least one processor is configured to receive the message for instructing the handover based on:

whether a target block error rate of the terminal is less than a predicted block error rate, the predicted block error rate is included in the message, whether a rate of successful transmission included in the message is greater than a third threshold, or whether a rate of unsuccessful transmission is less than a fourth threshold.

13. The terminal of claim 8, wherein the at least one processor is further configured to, upon determining to connect to the target base station, transmit updated data related to the backhaul quality information to the source base station.

14. The terminal of claim 8, wherein the backhaul quality information includes an indicator representing a predicted quality of the wireless backhaul connection, and wherein the indicator is increased or decreased in response to a change of a successful rate and a failure rate of connection to the target base station.

15. A source base station in a wireless communication system, the source base station comprising:

at least one transceiver; and at least one processor operatively coupled with the at least one transceiver, wherein the at least one processor is configured to:

receive, from a terminal, information regarding a link quality between the terminal and a target base station that has a wireless backhaul connection to a core network, receive, from the target base station, a second probing signal transmitted in response a first probing signal, determine backhaul quality information between the core network and the target base station based on the second probing signal, and transmit, to the terminal, a message for instructing a handover from the source base station to the target base station, wherein the handover is determined based on the link quality and the backhaul quality information in the source base station.

16. The source base station of claim 15, wherein the backhaul quality information includes at least one of an average of throughput, block error rate, quality of service, rate of successful transmission, or rate of unsuccessful transmission.

17. The source base station of claim 15, wherein the at least one processor is further configured to transmit the message to the terminal upon a determination that the link quality is equal to or greater than a first threshold.

18. The source base station of claim 15, wherein the at least one processor is further configured to, upon determining of the terminal to connect to the target base station, receive updated data related to the backhaul quality information to the source base station.

19. The source base station of claim 18, wherein the at least one processor is further configured to update the backhaul quality information based on the updated data.

20. The source base station of claim 15, wherein the backhaul quality information includes an indicator representing a predicted quality of the wireless backhaul connection, and wherein the indicator is increased or decreased in response to a change of a successful rate and a failure rate of connection to the target base station.

* * * * *